United States Patent
Chen

(10) Patent No.: US 12,528,155 B2
(45) Date of Patent: Jan. 20, 2026

(54) ELECTRIC TOOL GRINDING MACHINE WITH STATIC ELECTRICITY DISSIPATION

(71) Applicant: X'POLE PRECISION TOOLS INC., Taoyuan (TW)

(72) Inventor: Bach Pangho Chen, Claremont, CA (US)

(73) Assignee: X'POLE PRECISION TOOLS INC., Taoyuan (TW)

(*) Notice: Subject to any disclaimer, the term of this patent is extended or adjusted under 35 U.S.C. 154(b) by 347 days.

(21) Appl. No.: 18/335,423

(22) Filed: Jun. 15, 2023

(65) Prior Publication Data
US 2024/0416482 A1  Dec. 19, 2024

(51) Int. Cl.
B24B 55/10 (2006.01)
(52) U.S. Cl.
CPC ............................ B24B 55/102 (2013.01)
(58) Field of Classification Search
CPC ....... B24B 55/102; B24B 55/06; B24B 55/10; B24B 55/105; B23Q 11/0046; H05F 3/00; H05F 3/02; H05F 3/04
USPC ........................................................ 451/359
See application file for complete search history.

(56) References Cited

U.S. PATENT DOCUMENTS

| | | | | |
|---|---|---|---|---|
| 5,365,858 A | * | 11/1994 | Kuhns | B65D 19/0016 108/55.3 |
| 2009/0239453 A1 | * | 9/2009 | Nordstrom | B24B 49/10 318/400.3 |

FOREIGN PATENT DOCUMENTS

| | | | | |
|---|---|---|---|---|
| CN | 1765287 A | * | 5/2006 | |
| CN | 113453846 | | 9/2021 | |
| CN | 114986287 | | 9/2022 | |
| EP | 2554328 A1 | * | 2/2013 | ......... B23Q 11/0046 |

OTHER PUBLICATIONS

Millennium Circuits Limited found at https://web.archive.org/web/20211201151719/https://www.mclpcb.com/blog/heat-sink-pcb/ (Year: 2021).*
All About Circuits found at https://forum.allaboutcircuits.com/threads/heat-sinks-used-as-electrical-connections.187250/ (Year: 2022).*

* cited by examiner

Primary Examiner — Monica S Carter
Assistant Examiner — Caleb Andrew Holizna
(74) Attorney, Agent, or Firm — MUNCY, GEISSLER, OLDS & LOWE, P.C.

(57) ABSTRACT

An electric tool grinding machine with static electricity dissipation, the electric tool grinding machine includes a machine tool body, a motor disposed in the machine tool body, a power supply unit disposed in the machine tool body and connected to the motor, a grinding disc rotating with the motor, and a dust collecting element facing the grinding disc and assembled with the machine tool body. The power supply unit includes a power ground wire. The machine tool body includes a charge conducting element contacting the dust collecting element, and the charge conducting element is electrically connected to the power ground wire by one of the following: direct connection and indirect connection, when an electrostatic charge is generated on the dust collecting element, the charge conducting element conducts the electrostatic charge to the power ground wire.

13 Claims, 7 Drawing Sheets

ELECTRIC TOOL GRINDING MACHINE WITH STATIC ELECTRICITY DISSIPATION

FIELD OF THE INVENTION

The invention relates to an electric tool grinding machine, and more particularly to an electric tool grinding machine with static electricity dissipation.

BACKGROUND OF THE INVENTION

Grinding tools remove the surface material of a ground object by driving abrasive materials (such as sandpaper, grinding disc, grinding belt, grinding wheel). The grinding process will generate dust, which will pollute the surrounding environment, and frequent inhalation of dust into the human body will also cause harm to health, so when tool grinding is implemented, dust collection operation is generally carried out at the same time.

The common dust collecting operation is implemented by a dust collecting element disposed on the grinding tool, a dust collecting pipe connected with the dust collecting element, and a dust suction device communicating with the dust collecting element through the dust collecting pipe. When the dust suction device is in operation, suction force is generated to make the dust pass through the dust collecting element and the dust collection pipe, and finally be collected in the dust suction device.

Although this method can effectively reduce the pollution of dust to the surrounding environment, when the dust moves at a high speed in the dust collecting element and the dust collecting pipe by suction, the dust will rub against the inner wall of the dust collecting element and/or the dust collecting pipe to generate static electricity. When static electricity is in an environment with high relative humidity, the electrostatic voltage may be only a few hundred volts, but when static electricity is in an environment with low relative humidity, the electrostatic voltage can be as high as thousands of volts. When the relative humidity of the environment is below 20%, the electrostatic voltage is more likely to exceed 10,000 volts. Such a high electrostatic voltage is likely to generate spark discharge instantaneously when the worker touches the grinding tool, causing shock or injury to the worker, and the instantaneous discharge may also cause damage to the electronic components in the grinding tool. In order to solve the aforementioned problems, there are mainly two existing implementation solutions. One of the implementation solutions is to use the dust suction device with anti-static function, and an anti-static dust suction pipe. The anti-static dust suction pipe has one of the following: a conductive wire is wound inside the pipe and a conductive material is coated on the surface, such as in CN114986287A. The aforesaid dust collection device is provided with a ground point at a communication port used to connect with the anti-static dust suction pipe. When the anti-static dust suction pipe is connected to the communication port, the ground point forms an electrical connection with the conductive wire. Thereby, static electricity can be guided to the ground through the ground point.

Although this implementation mode seems simple, the anti-static dust suction pipe is expensive, and it needs to be implemented with the dust suction device that can be connected to the anti-static dust suction pipe, which greatly reduces the desire of users to buy. In addition, there are even incompatibility issues among various brands.

The second implementation solution is to make the dust collecting element possess electrostatic conductivity. The dust collecting element can be made of metal to avoid static electricity accumulation through the conductive ability of metal. However, the configuration of the dust collecting element is not a simple straight line, which leads to complicated processing. The processing costs of metal parts are much higher than the costs of plastic injection molding. In addition, grinding operation is different from cutting operation, workers generally need to hold the grinding tool for a long time. Implementation with metal parts will cause the grinding tool to become heavy, which is not conducive to long-term use.

In addition to the foregoing, CN113453846A discloses a dust collecting hood for power tools, the dust collecting hood or its inner wall is made of a conductive base material that transfers electrostatic charges from the dust collecting hood to a suction hose, which ensures that electrostatic charges are dissipated via the dust suction device. It can be known that although the dust collecting hood of CN113453846A has the ability to guide electrostatic charges due to the static dissipative material, it still needs to be implemented with the dust suction device with anti-static function and the anti-static dust suction pipe, and therefore the above-mentioned problems still exist.

SUMMARY OF THE INVENTION

A main object of the invention is to solve the problem that conventional electric tool grinding machines easily accumulate static electricity when collecting dust.

A secondary object of the invention is to solve the problems caused by all static electricity elimination solutions must be implemented with specific devices.

Another secondary object of the invention is to implement static electricity dissipation without excessively modifying a framework of an electric tool grinding machine.

In order to achieve the above objects, the invention provides an electric tool grinding machine with static electricity dissipation. The electric tool grinding machine includes a machine tool body, a motor disposed in the machine tool body, a power supply unit disposed in the machine tool body and connected to the motor, a grinding disc rotating with the motor, and a dust collecting element facing the grinding disc and assembled with the machine tool body. The power supply unit includes a power ground wire. The machine tool body includes a charge conducting element contacting the dust collecting element, and the charge conducting element is electrically connected to the power ground wire by one of the following: direct connection and indirect connection. When an electrostatic charge is generated on the dust collecting element, the charge conducting element conducts the electrostatic charge to the power ground wire.

In one embodiment, a surface resistance value of the dust collecting element is between $10^3$ ohms and $10^7$ ohms.

In one embodiment, the power supply unit comprises a circuit board and a heat sink, the circuit board includes a grounding part thereon connected to the power ground wire, the heat sink is electrically connected to the grounding part, the charge conducting element is electrically connected to the heat sink, and the charge conducting element is indirectly connected to the power ground wire via the heat sink.

In one embodiment, the machine tool body includes a linking block for assembling the dust collecting element, the dust collecting element includes a connecting block assembled with the linking block, the charge conducting element is disposed on the linking block, and the dust collecting element includes a contact surface disposed on the connecting block and facing the charge conducting element.

In one embodiment, one of the linking block and the connecting block is shaped as a groove-like structure for snapping in.

In one embodiment, the linking block is the groove-like structure, and the charge conducting element is disposed on a terminal of the groove-like structure.

In one embodiment, the dust collecting element includes an auxiliary conducting element disposed on the contact surface and contacts the charge conducting element.

In one embodiment, the machine tool body is divided into a grasping part and a gripping part connected with the grasping part, in and the linking block is located on the gripping part.

In one embodiment, the dust collecting element is connected with a dust collecting pipe.

In one embodiment, materials of the dust collecting element comprise a static dissipative material.

In one embodiment, the static dissipative material is less than 30% of all materials used to make the dust collecting element.

Through the aforementioned implementation of the invention, the invention has the following characteristics compared with the prior art.

1. The dust collecting element of the invention is electrically connected to the power ground wire through the charge conducting element on the machine tool body, so that the dust collecting element is always grounded and static electricity can be specifically dissipated.

2. The invention provides a framework to meet requirements of static electricity dissipation under conditions of without substantially changing a structure of the electric tool grinding machine and without making the dust collecting element with metal.

3. Implementation of the electric tool grinding machine of the invention does not need to be equipped with the dust suction device with anti-static function and the anti-static dust suction pipe to realize static electricity dissipation.

DETAILED DESCRIPTION OF THE PREFERRED EMBODIMENTS

Figure 1:
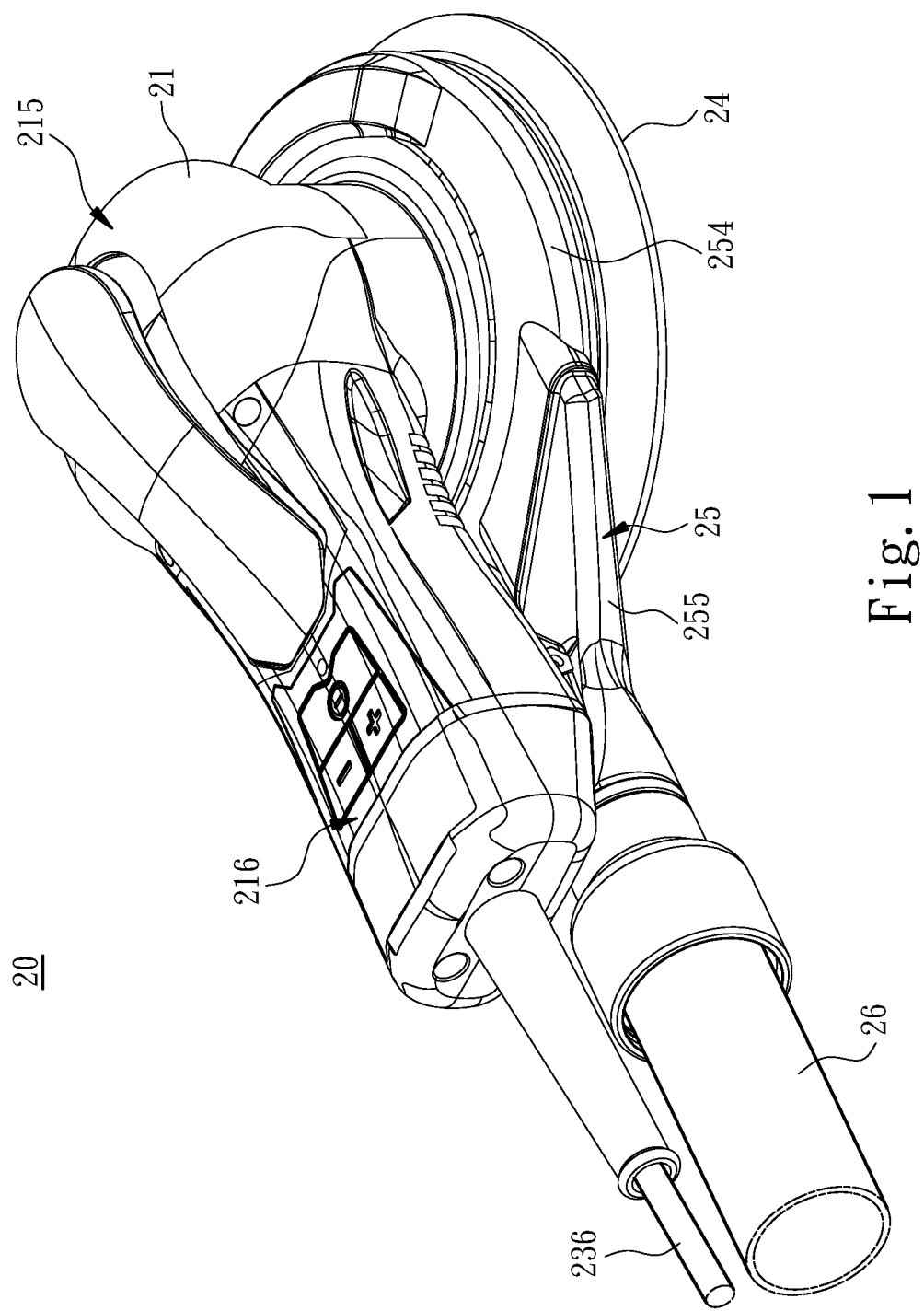
FIG. 1 is a first perspective structural view of an electric tool grinding machine of the invention.

The detailed description and technical content of the invention are described below with reference to the accompanying drawings.

Please refer to FIG. 1, FIG. 2, FIG. 3, FIG. 4 and FIG. 5, the invention provides an electric tool grinding machine 20 with static electricity dissipation, the electric tool grinding machine 20 includes a machine tool body 21, a motor 22 disposed in the machine tool body 21, a power supply unit 23 disposed in the machine tool body 21 and connected to the motor 22, a grinding disc 24 that rotates with the motor 22, and a dust collecting element 25 facing the grinding disc 24 and assembled with the machine tool body 21. The power supply unit 23 comprises at least one power live wire 231, a power ground wire 232, a circuit board 233 connected to the at least one power live wire 231 and the power ground wire 232, and a plurality of electronic components 234 disposed on the circuit board 233. The power supply unit 23 generates functional circuits required for operation of the electric tool grinding machine 20 such as power conversion through the electronic components 234 and printed circuits on the circuit board 233. The circuit board 233 includes a grounding part 235 connected to the power ground wire 232. The at least one power live wire 231 and the power ground wire 232 extend to reach the machine tool body 21. The at least one power live wire 231 and the power ground wire 232 are collectively disposed in a power wire 236. On the other hand, the dust collecting element 25 is implemented with a dust collecting pipe 26, one end of the dust collecting pipe 26 is connected to the dust collecting element 25, and the other end of the dust collecting pipe 26 is connected to a dust suction device (not shown in the figures). When the dust suction device is activated, dust produced by the grinding disc 24 will be collected through the dust collecting element 25.

Figure 2:
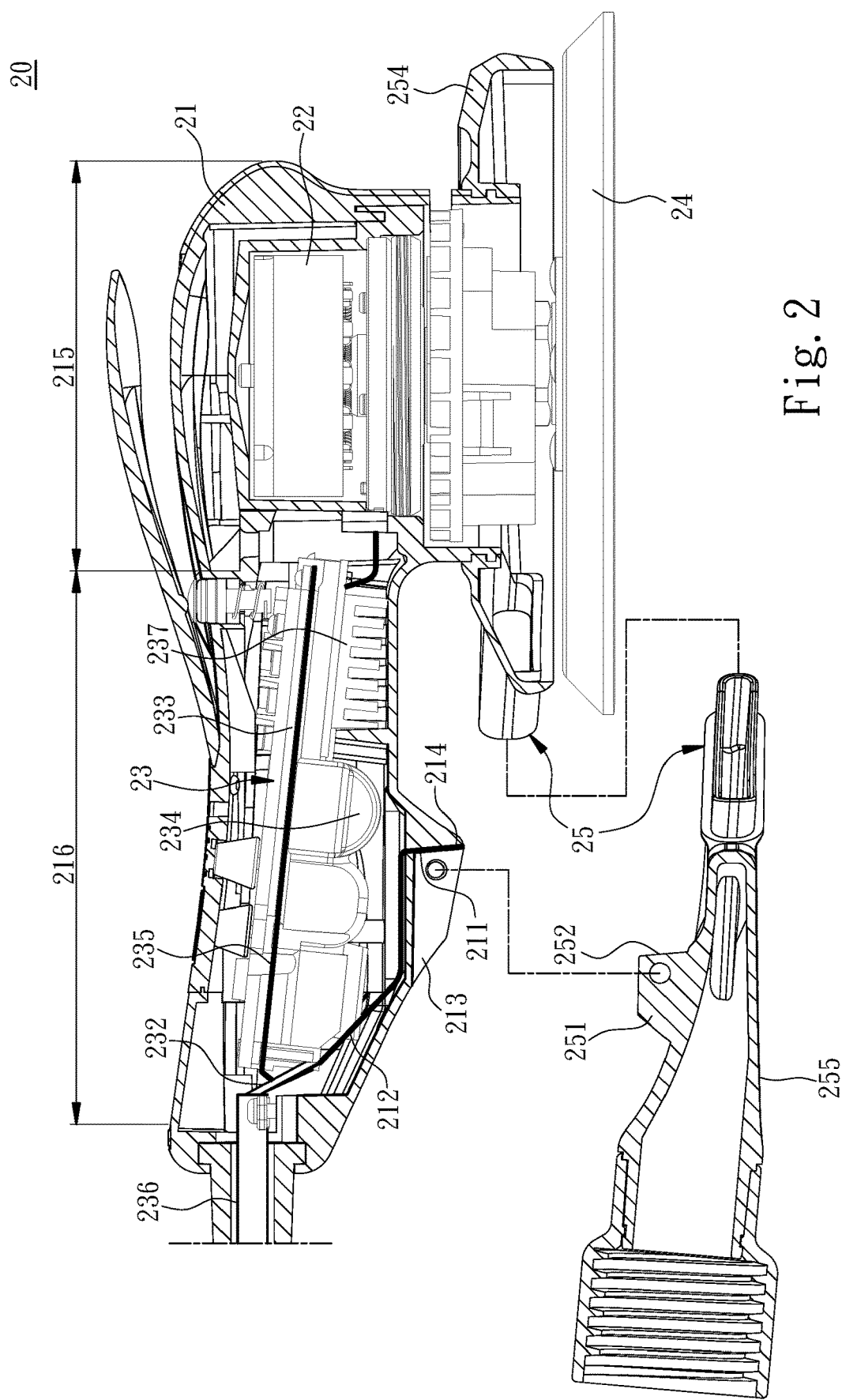
FIG. 2 is an exploded structural sectional view of a first embodiment of the electric tool grinding machine of the invention.
Figure 3:
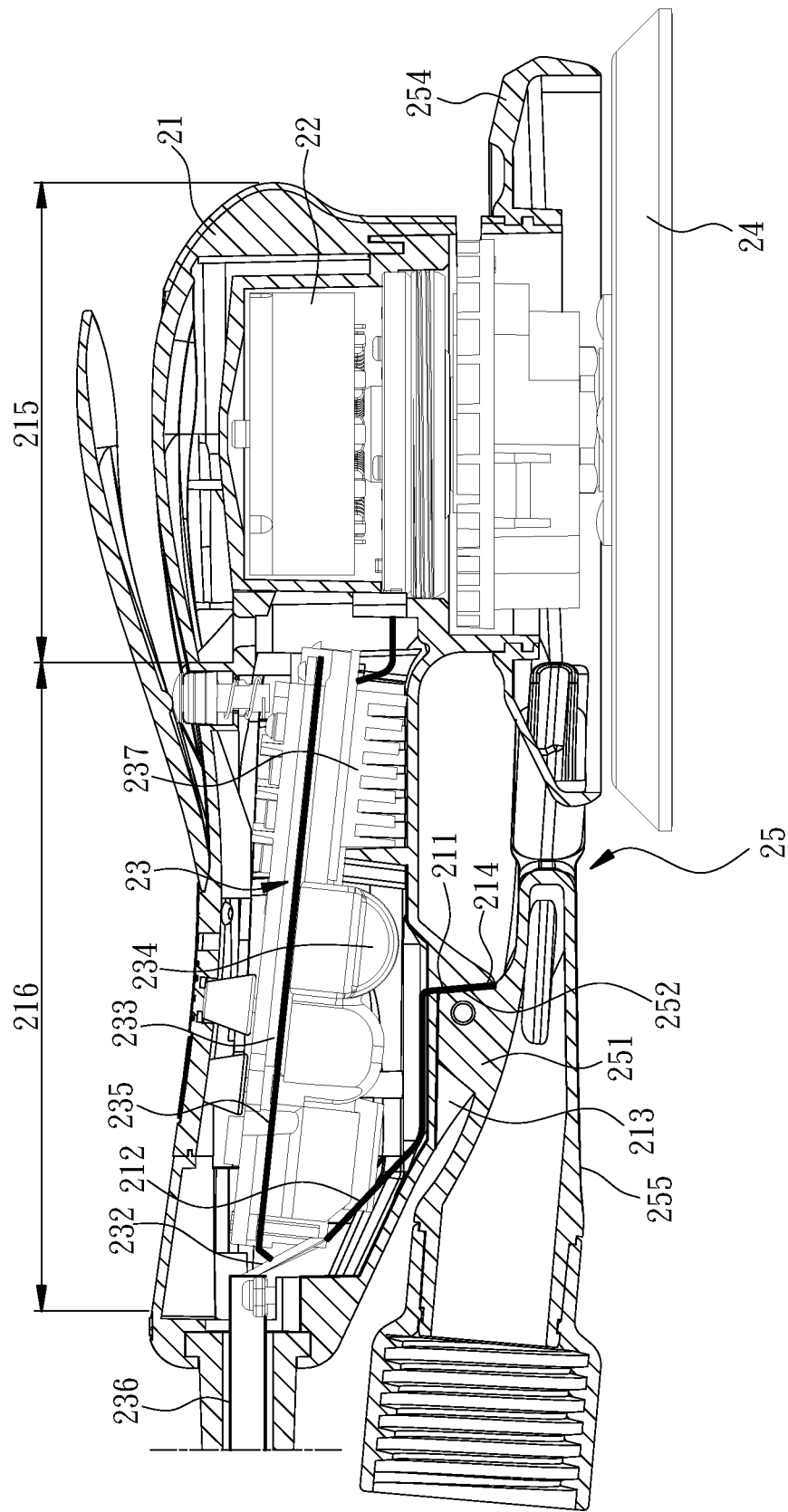
FIG. 3 is a structural sectional view of the first embodiment of the electric tool grinding machine of the invention.
Figure 4:
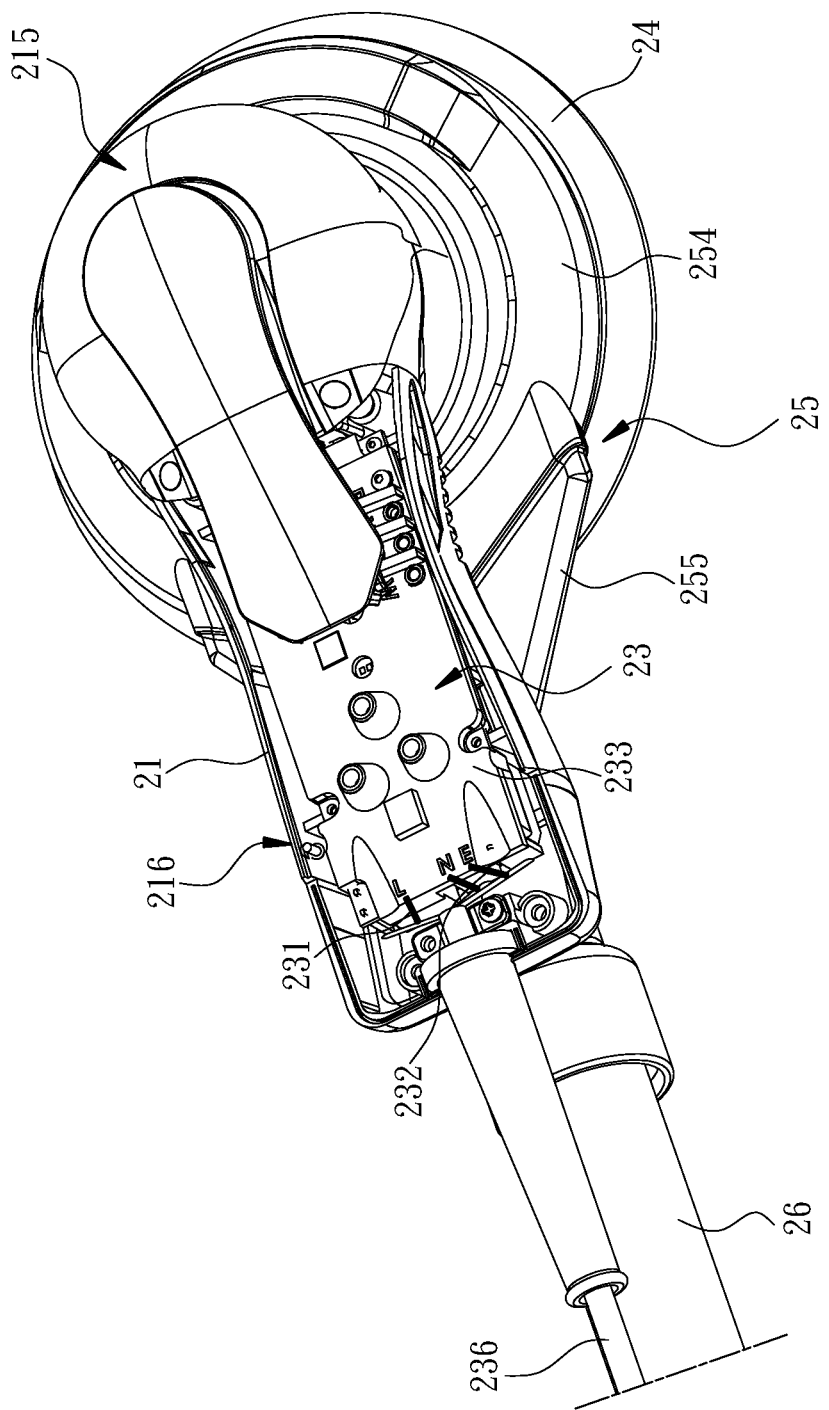
FIG. 4 is a second perspective structural view of the electric tool grinding machine of the invention.
Figure 5:
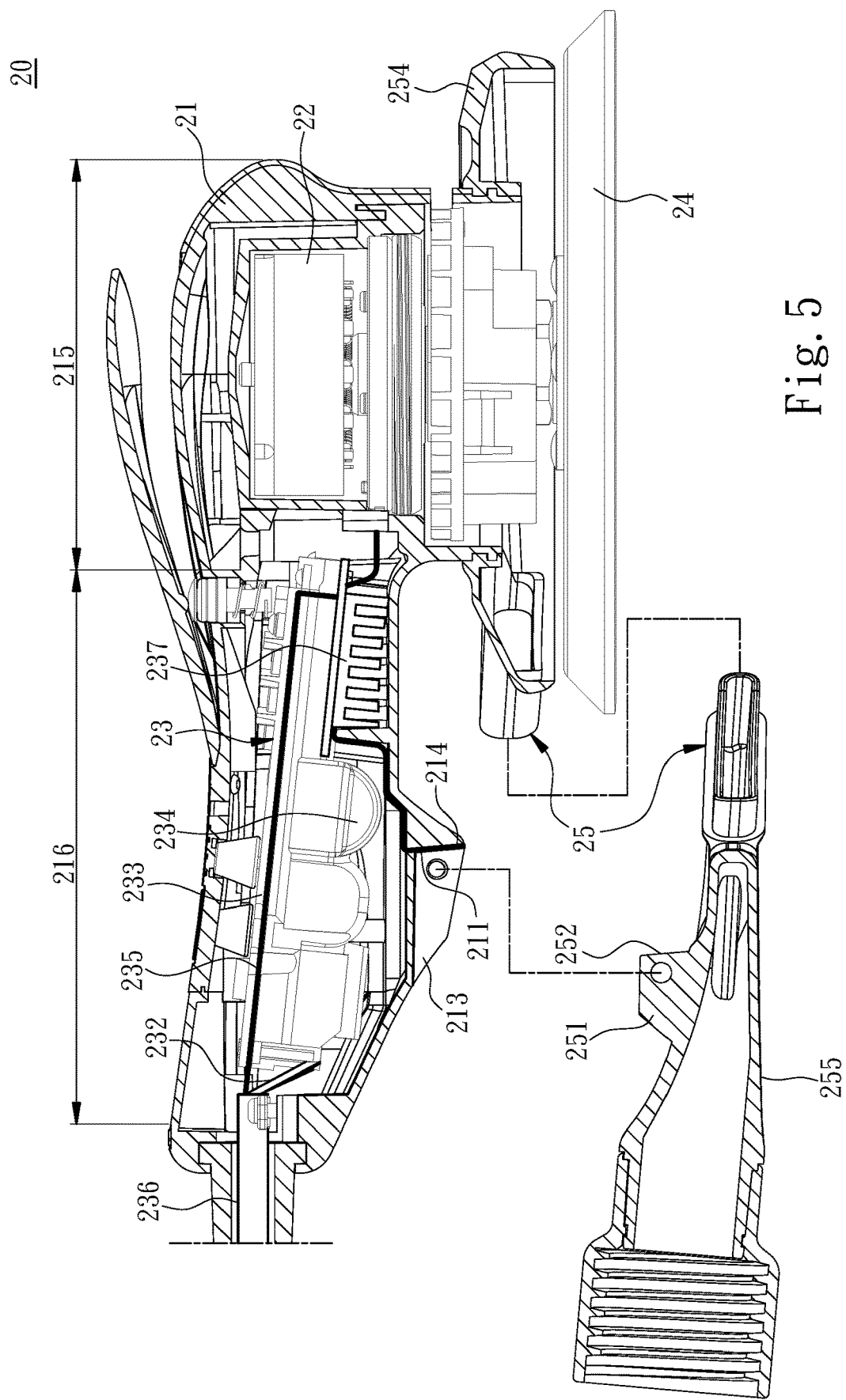
FIG. 5 is an exploded structural sectional view of a second embodiment of the electric tool grinding machine of the invention.

Please refer to FIG. 2, FIG. 3 and FIG. 5, the dust collecting element 25 of the invention has static dissipative characteristics, without initial electric charge or only a small amount of initial electric charge, to prevent discharging when in contact with a human body. On the other hand, the machine tool body 21 includes a charge conducting element 211 contacting the dust collecting element 25, and the charge conducting element 211 is electrically connected to the power ground wire 232 by one of the following: direct connection and indirect connection. No matter in which manner the charge conducting element 211 is being connected, the charge conducting element 211 will form an electrical connection relationship with the power ground wire 232. By the aforementioned structure, an electrostatic charge generated by friction between the dust and an inner wall of the dust collecting element 25 during a suction process no longer accumulates on the dust collecting element 25, the dust will move through a contact between the dust collecting element 25 and the charge conducting element 211. Due to an electrical connection relationship between the charge conducting element 211 and the power ground wire 232, the electrostatic charge is guided to the power ground wire 232 to achieve an object of static electricity dissipation.

The invention provides an implementation framework to meet requirements of static electricity dissipation under conditions of without substantially changing a structure of the electric tool grinding machine 20 and without making the dust collecting element 25 with metal. In addition to the above, the invention is capable of dissipating a static electricity when an operator touches the dust collecting element 25 and the operator has static electricity, avoiding a phenomenon of spark discharge, and greatly increasing a safety of the electric tool grinding machine 20 in terms of static electricity protection. Furthermore, an implementation of the electric tool grinding machine 20 of the invention does not need to be equipped with the dust suction device with anti-static function and an anti-static dust suction pipe to realize static electricity dissipation. In addition to adding product value, consumers can use the invention without spending a lot of money.

In one embodiment, a surface resistance value of the dust collecting element 25 of the electric tool grinding machine 20 is between $10^3$ ohms and $10^7$ ohms, preferably a surface resistance value of the dust collecting element 25 is between $10^3$ ohms and $10^5$ ohms. Further, materials of the dust collecting element 25 comprise a static dissipative material. The static dissipative material refers to a material containing carbon conductive elements, such as carbon powder or carbon fiber. Further, the static dissipative material is less than 30% of all materials used to make the dust collecting element 25. It should be understood that the dust collecting element 25 of the invention uses plastic as a main material, and the static dissipative material is mixed with a material used for injection molding to make the dust collecting element 25.

Please refer to FIG. 2 and FIG. 3, the charge conducting element 211 of the invention is directly connected to the power ground wire 232 through a conductive wire 212. Please refer to FIG. 5 as well, the aforementioned indirect connection of the invention means that the charge conducting element 211 is electrically connected to the power ground wire 232 through a third structure other than the conductive wire 212. In one embodiment, the power supply unit 23 further comprises a heat sink 237 used for assisting the electronic components 234 to dissipate heat. The heat sink 237 is a metal component or a metal-containing component. In this embodiment, the heat sink 237 is electrically connected to the grounding part 235 of the circuit board 233, and the charge conducting element 211 is electrically connected to the heat sink 237. More specifically, a connection relationship is formed between the charge conducting element 211 with the heat sink 237 through the conductive wire 212, so that the charge conducting element 211 is indirectly connected to the power ground wire 232 through the heat sink 237.

Please refer to FIG. 2 and FIG. 3, the machine tool body 21 includes a linking block 213 provided for assembling the dust collecting element 25, and the dust collecting element 25 includes a connecting block 251 assembled with the linking block 213. The charge conducting element 211 is disposed on the linking block 213, and the dust collecting element 25 includes a contact surface 252 disposed on the connecting block 251 and facing the charge conducting element 211. It should be understood that although the charge conducting element 211 is preferably in full contact with the contact surface 252, the invention is not limited thereto, as long as the charge conducting element 211 does not contact with the contact surface 252 in points. Please refer to FIG. 2 and FIG. 3 again, one of the linking block 213 and the connecting block 251 is formed as a groove-like structure for snapping in, and the other one is formed to fit with the groove-like structure. In this way, in addition to stabilizing an assembly relationship between the machine tool body 21 and the dust collecting element 25, the charge conducting element 211 always contacting the contact surface 252 is also ensured. Please refer to FIG. 2 and FIG. 3 again. In one embodiment, the linking block 213 is a groove-like structure, and the charge conducting element 211 is disposed in the groove-like structure. Further, the charge conducting element 211 is disposed on a terminal 214 of the groove-like structure. The machine tool body 21 is divided into a grasping part 215 and a gripping part 216 connected with the grasping part 215 based on a shape of the machine tool body 21. Most part of the power supply unit 23 is located on the gripping part 216, and the motor 22 is located on the grasping part 215. Moreover, the linking block 213 is located on the gripping part 216 and faces the dust collecting element 25.

Figure 6:
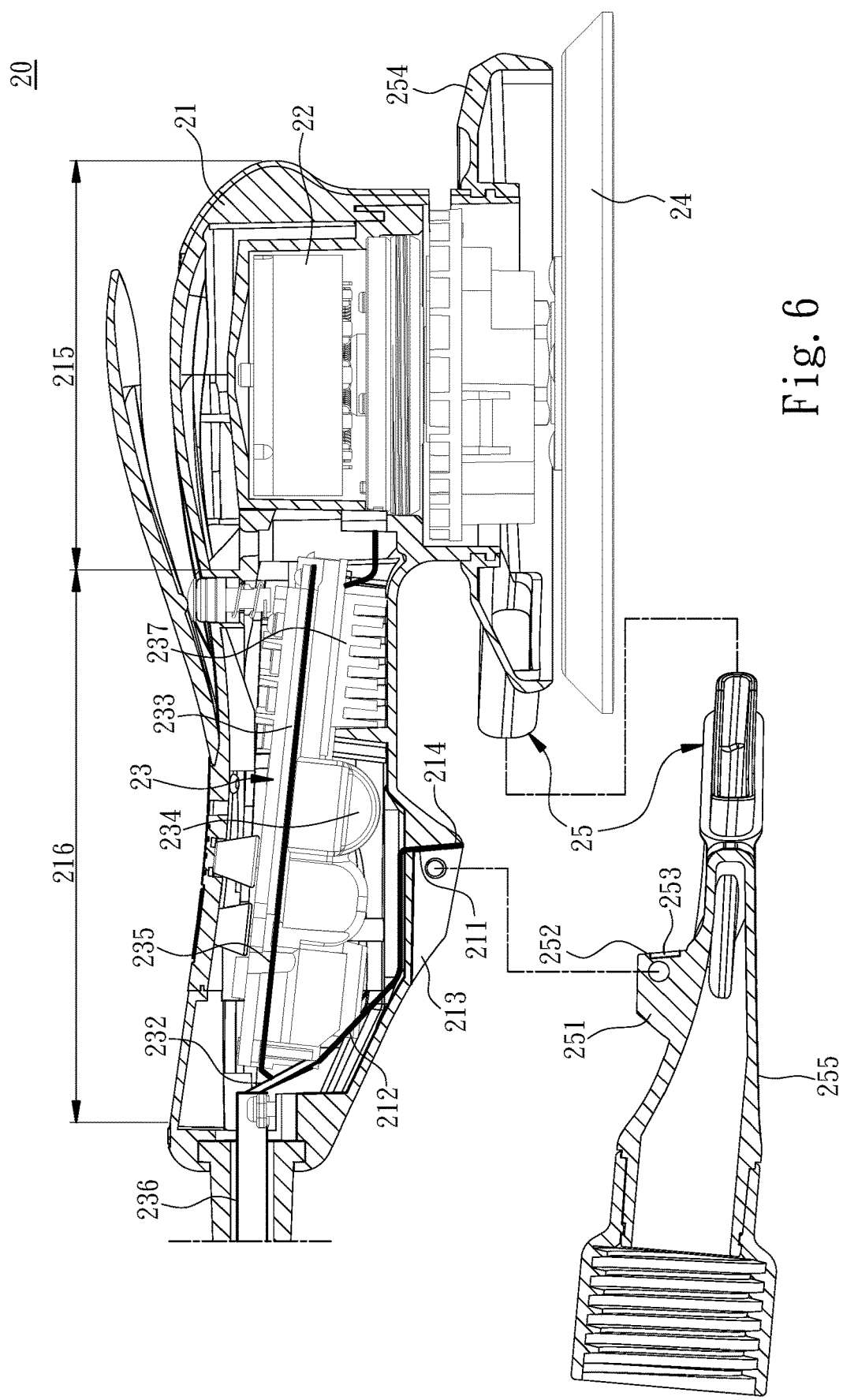
FIG. 6 is an exploded structural sectional view of a third embodiment of the electric tool grinding machine of the invention.

Please refer to FIG. 6, in one embodiment, the dust collecting element 25 is provided with an auxiliary conducting element 253 disposed on the contact surface 252 and contacted to the charge conducting element 211. The auxiliary conducting element 253 is a metal terminal for strengthening an electrical connection between the dust collecting element 25 and the charge conducting element 211.

Figure 7:
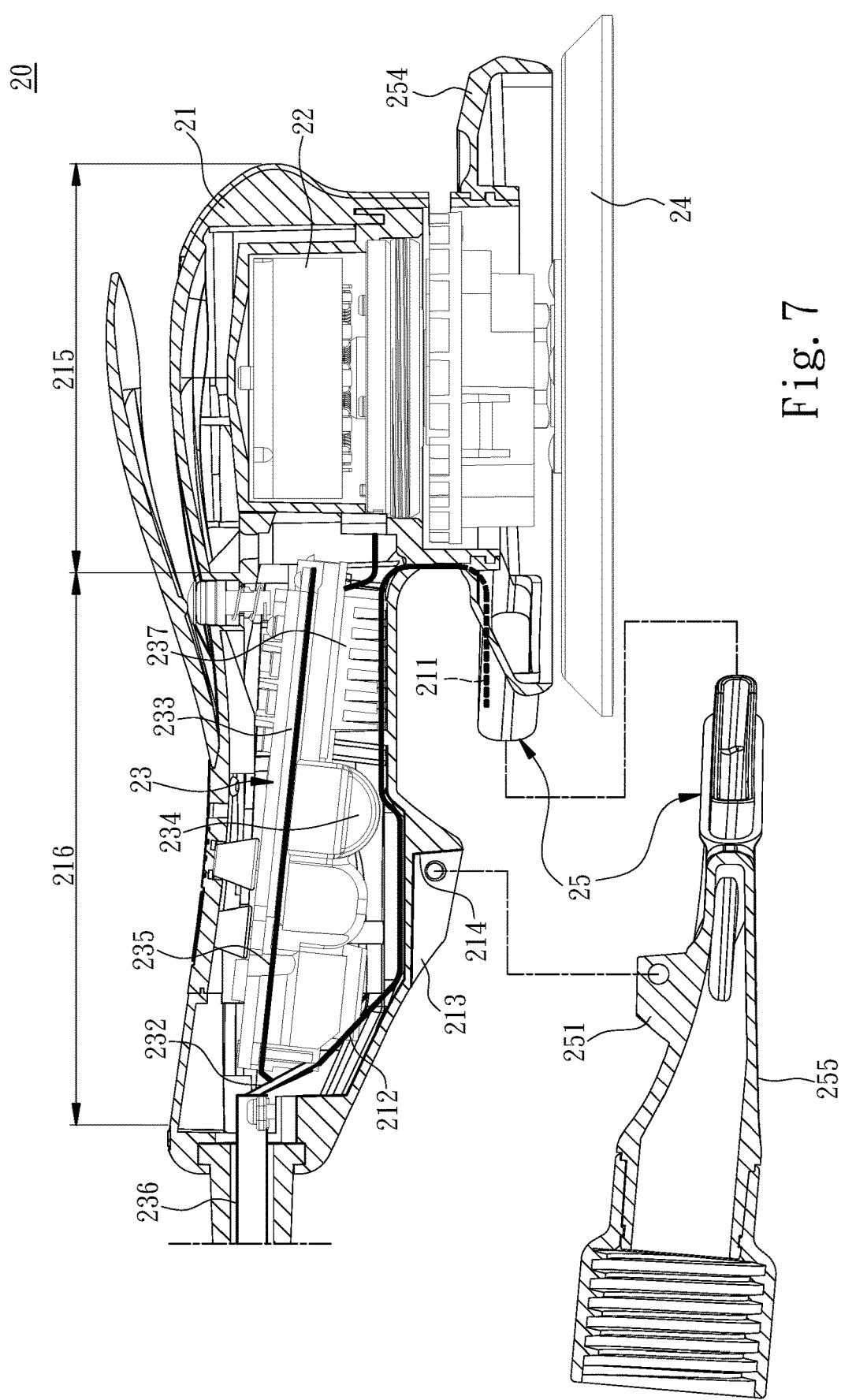
FIG. 7 is an exploded structural sectional view of a fourth embodiment of the electric tool grinding machine of the invention.

Please refer to FIG. 2 and FIG. 5, the dust collecting element 25 of the invention is a dust collecting hood 254 on the electric tool grinding machine 20, a dust collection connecting pipe 255 for connecting the dust collecting pipe 26, or a combination of the dust collecting hood 254 and the dust collection connecting pipe 255, wherein the combination of the dust collecting hood 254 and the dust collection connecting pipe 255 is integrally formed, or the dust collecting hood 254 and the dust collection connecting pipe 255 are components that can be optionally assembled. To implement the dust collection connecting pipe 255 of the dust collecting element 25 of the invention, the charge conducting element 211 is disposed at a position where the dust collection connecting pipe 255 is connected with other structures, as disclosed in FIG. 3 and FIG. 7. In an embodiment disclosed in FIG. 7, the dust collecting element 25 refers to the combination of the dust collection connecting pipe 255 and the dust collecting hood 254, and the charge conducting element 211 extends from the machine tool body 21 to reach a connection position between the dust collection connecting pipe 255 and the dust collecting hood 254. Furthermore, a position of the auxiliary conducting element 253 is designed according to a position of the charge conducting element 211.

What is claimed is:

1. An electric tool grinding machine with static electricity dissipation, the electric tool grinding machine comprising a machine tool body, a motor disposed in the machine tool body, a power supply unit disposed in the machine tool body and connected to the motor, a grinding disc rotatable with the motor, and a dust collecting element facing the grinding disc when assembled with the machine tool body, the power supply unit comprising a power ground wire, wherein the dust collecting element comprises a pipe-structure component and the electric tool grinding machine is characterized in that:

the power supply unit comprises a circuit board and a heat sink, the circuit board comprises a grounding part thereon connected to the power ground wire, the heat sink is electrically connected to the grounding part, and the machine tool body comprises a charge conducting element contacting the dust collecting element, the charge conducting element is electrically connected to the heat sink, and the charge conducting element is indirectly connected to the power ground wire via the heat sink, wherein the grounding part is a structure made of conductive material, and when an electrostatic charge is generated on the dust collecting element, the charge conducting element is capable of conducting the electrostatic charge to the power ground wire, wherein the charge conducting element is a structure made of conductive material.

2. The electric tool grinding machine with static electricity dissipation as claimed in claim 1, wherein a surface resistance value of the dust collecting element is between $10^3$ ohms and $10^7$ ohms.

3. The electric tool grinding machine with static electricity dissipation as claimed in claim 1, wherein the machine tool body comprises a linking block for assembling the dust collecting element, the dust collecting element comprises a connecting block configured to assemble with the linking block, the charge conducting element is disposed on the linking block, and the dust collecting element comprises a contact surface disposed on the connecting block and facing the charge conducting element.

4. The electric tool grinding machine with static electricity dissipation as claimed in claim 3, wherein one of the linking block and the connecting block is shaped as a groove-like structure for snapping in.

5. The electric tool grinding machine with static electricity dissipation as claimed in claim 4, wherein the linking block is the groove-like structure, and the charge conducting element is disposed on a terminal of the groove-like structure.

6. The electric tool grinding machine with static electricity dissipation as claimed in claim 3, wherein materials of the dust collecting element comprise a static dissipative material.

7. The electric tool grinding machine with static electricity dissipation as claimed in claim 6, wherein the static dissipative material is less than 30% of all materials used to make the dust collecting element.

8. The electric tool grinding machine with static electricity dissipation as claimed in claim 3, wherein the dust collecting element comprises an auxiliary conducting element disposed on the contact surface and contacts the charge conducting element.

9. The electric tool grinding machine with static electricity dissipation as claimed in claim 3, wherein the machine tool body is divided into a grasping part and a gripping part connected with the grasping part, and the linking block is located on the gripping part.

10. The electric tool grinding machine with static electricity dissipation as claimed in claim 9, wherein the dust collecting element is connected with a dust collecting pipe.

11. The electric tool grinding machine with static electricity dissipation as claimed in claim 1, wherein the dust collecting element is connected with a dust collecting pipe.

12. The electric tool grinding machine with static electricity dissipation as claimed in claim 1, wherein materials of the dust collecting element comprise a static dissipative material.

13. The electric tool grinding machine with static electricity dissipation as claimed in claim 12, wherein the static dissipative material is less than 30% of all materials used to make the dust collecting element.

* * * * *